Figure 1:
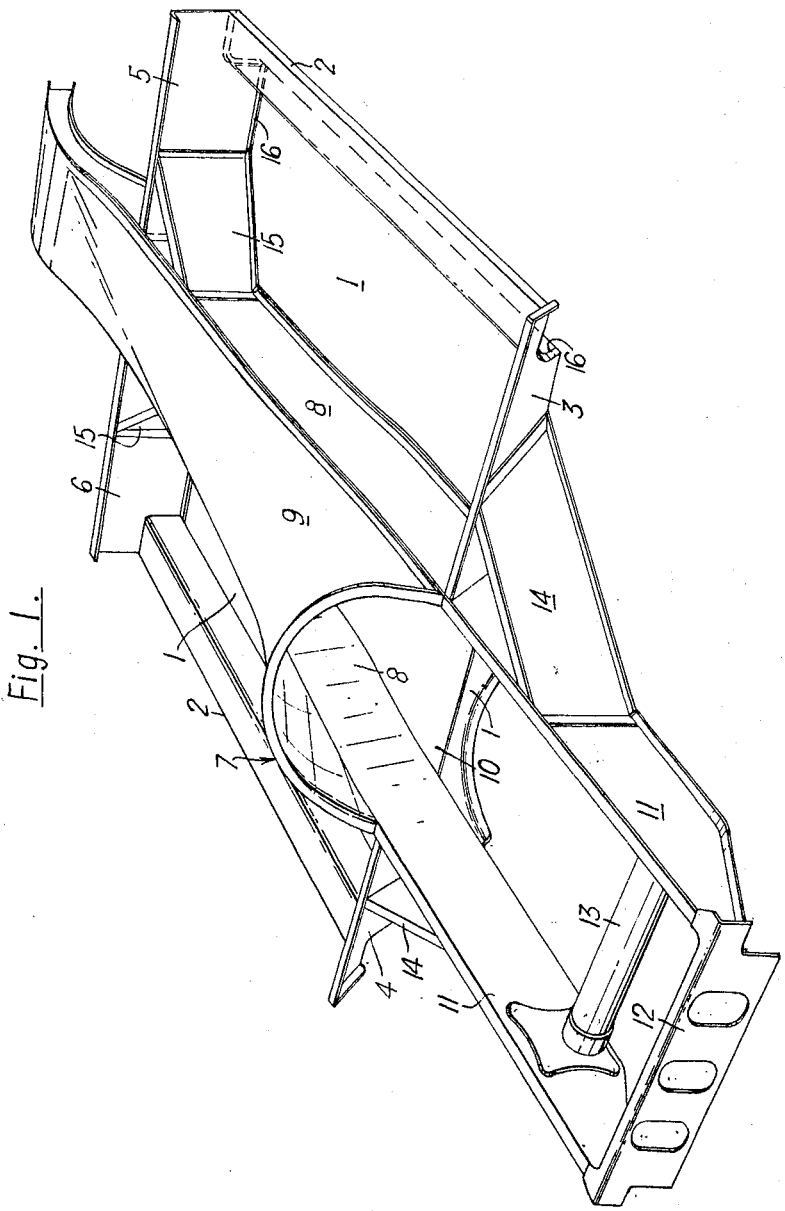

Oct. 18, 1966  A. A. ISSIGONIS  3,279,816
MOTOR VEHICLE CHASSIS FRAMES
Filed May 11, 1964  2 Sheets-Sheet 2

Alexander Arnold Issigonis
Inventor

By Scrivener Parker
Scrivener & Clarke
Attorneys 3,279,816
MOTOR VEHICLE CHASSIS FRAMES
Alexander A. Issigonis, Edgbaston, Birmingham, England, assignor to The Austin Motor Company Limited, Longbridge, Birmingham, England
Filed May 11, 1964, Ser. No. 366,582
4 Claims. (Cl. 280—106)

This invention relates to chassis frames or underbody structures for motor vehicles, and is particularly (although not exclusively) applicable to open vehicles; especially those of the kind commonly known as sports cars.

In the structural design of any motor car, the designer's principal aim is to achieve the highest torsional rigidity with the minimum structural weight. This desideratum assumes outstanding importance in the case of open cars, since, in contrast to saloon-type vehicles, they have no stress-bearing enclosed bodywork to contribute to the overall strength and rigidity of the vehicle structure and, therefore, need to be endowed with an inherently stronger and more torsion-resistant chassis frame or underbody structure. This requirement is met very satisfactorily by the improved design of chassis frame which is afforded by the present invention, and which may be regarded as representing a development or variant of the known backbone-type chassis frame.

According to the invention a chassis frame or underbody structure for a motor vehicle is fabricated entirely of sheet metal, and comprises a floor panel structure having rigidly secured to it, at least at one end zone, a transverse bulkhead, and, at the other end zone, a pair of oppositely directed outriggers; and a central stress-bearing tunnel-like member rigidly secured to the bulkhead and to the outriggers, so as to receive torsional stresses transmitted therefrom; the tunnel-like member being of abnormally large cross-sectional area and having a bottom closure of double thickness formed in part by the floor panel structure, which, throughout its length, is united to the tunnel-like member.

In the case of the conventional driving arrangement, in which the power unit is disposed longitudinally at the front end of the vehicle and the drive is transmitted to the rear wheels, the tunnel-like member is designed to accommodate and to enclose the entire power transmission system, including the gearbox. But the invention is equally applicable to other driving arrangements; for example, having the power unit located either at the front or rear end, and driving the corresponding road wheels, or having it disposed transversely. Moreover, the invention is especially advantageous for vehicles having two engines, one at the front and the other at the rear. In this case it may be desirable to employ two bulkheads, secured to the respective end zones of the chassis frame.

Whichever of the various alternative driving arrangements is employed, a bulkhead panel, secured to the outriggers is also secured to, and thus stabilizes, the adjoining mouth of the tunnel-like member which, being of large cross-section and of relatively thin material, would otherwise suffer distortion at the points of load application.

In the case of sports cars particularly, in order to achieve the desired low build, the floor of the car has to be low and, consequently, with the conventional driving arrangement referred to above, the gearbox has to stand at a considerable height above the floor, to preserve the requisite ground clearance. This circumstance is exploited to good effect by the invention, which, in practice, results in the transmission system being surrounded by the principal stress-bearing metal.

Figure 2:
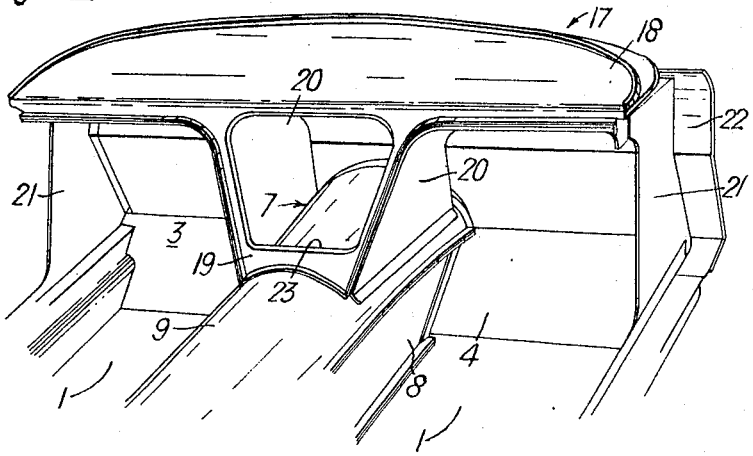
Figure 3:
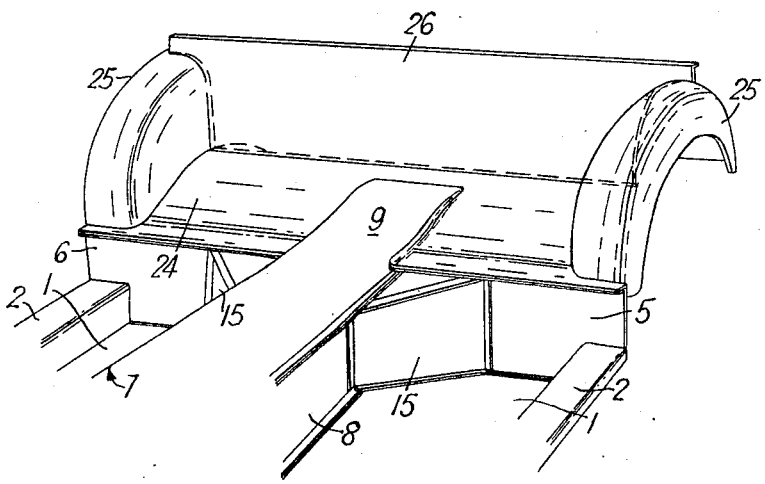

Referring to the accompanying drawings:
FIGURE 1 is a perspective view of a motor vehicle chassis frame or underbody structure constructed in accordance with the invention;
FIGURE 2 is a fragmentary perspective view showing a dash panel assembly combined with the structure of FIGURE 1; and
FIGURE 3 is a fragmentary perspective view showing a rear bulkhead structure added to the structure of FIGURE 1.

The chassis frame or underbody structure illustrated in FIGURE 1, which is fabricated entirely of sheet metal components welded or otherwise rigidly secured together, is designed for a vehicle with the conventional driving arrangement referred to previously. It includes a floor panel structure 1 which is a pressing formed with integral side sills 2, and which has secured to its forward end zone a pair of oppositely directed outriggers 3 and 4, and to its rear end zone a transverse bulkhead formed by a pair of flanged panels 5 and 6. A central stress-bearing tunnel-like member 7, of abnormally large cross-sectional area, is rigidly secured to the rear bulkhead panels 5 and 6, and to the outriggers 3 and 4, so as to receive torsional stresses transmitted therefrom.

The tunnel-like member 7 comprises an assembly of four components which are welded together; namely, a pair of flanged longitudinal side panels 8, a flanged top closure panel 9 and a bottom closure panel 10. The latter overlies the floor panel structure 1, so that the tunnel-like member 7 has a bottom closure of double thickness. The base flanges of the side panels 8 are united to the panel 10 and to the floor panel structure 1 throughout the length of that structure. The side panels 8 and the top closure panel 9 of the tunnel-like member 7 are of thicker material than the floor panel structure 1. For example, the latter may be of No. 20 S.W.G., the side panels 8 of No. 16 S.W.G., and the top closure panel 9 of No. 14 S.W.G.

The side panels 8 of the tunnel-like member 7 project from its forward end to form a pair of longitudinal cantilever girders 11, for carrying the front suspension (and also the power unit, in the case of a front-engined vehicle). The girders 11, which are interconnected at their forward extremities by a cross-member 12, may also be interconnected by a tubular member 13 which, if desired, can serve to accommodate horizontally-disposed hydraulic displacer units (not shown) of the front suspension system. The girders 11 are stabilized transversely by means of flanged oblique struts 14 affording rigid anchorages to the main structure of the chassis frame. The latter, of course, also includes provision for carrying the rear suspension.

In the case of a vehicle with independent rear suspension, or with the conventional driving arrangement, the tunnel-like member 7 extends rearwardly beyond the floor panel assembly 1, as shown in FIGURE 1, to support the differential gear assembly (not shown).

It will be appreciated that, in the case of the conventional driving arrangement, the tunnel-like member 7 may have holes (not shown) affording access to lubrication points, and that general access to the transmission system is obtained by withdrawing the power unit from the adjoining end of the tunnel-like member.

The rear bulkhead panels 5 and 6 are stabilized by flanged oblique struts 15 affording rigid connection to the corresponding side panel 8 of the tunnel-like member 7. The outriggers 3 and 4, and the bulkhead panels 5 and 6, are formed with welding flanges 16 for the floor panel structure 1 and its side sills 2.

Additional strength is imparted to the chassis frame structure by combining with it a dash panel assembly 17 (FIG. 2). This includes a substantially horizontal top transverse panel 18 formed with a downwardly extending central portion 19 which is flanged for attachment both to the top closure panel 9 of the tunnel-like member 7 and to a pair of angled buttress panels 20. These are flanged for attachment to the panel 9 and to flanged vertical side panels 21, which are secured to the main chassis frame structure and to the top transverse panel 18 as well as to a bulkhead panel 22. This panel, which is secured to the panels 20 and to the outriggers 3 and 4 (FIG. 1), is cut away to register with the flanged end of the panel 9 to which it is also secured, in order to stabilize the adjoining mouth of the tunnel-like member 7.

The portion 19 of the dash panel assembly 17 is formed with a flanged aperture 23 which serves to accommodate an instrument console.

At the rear end of the chassis frame structure, a panel 24 is secured to the bulkhead panels 5 and 6 and to the tunnel-like member 7. Wheel-arch panels 25 are secured to the panel 24, and to a further bulkhead panel 26 which is secured to the panel 24.

I claim:

1. A motor vehicle chassis frame comprising a floor panel structure having rigidly secured to it, at least at one end zone, a transverse bulkhead, and, at the other end zone, a pair of oppositely directed outriggers; and a central stress-bearing tunnel-like member rigidly secured to the bulkhead and to the outriggers, so as to receive torsional stresses transmited therefrom; the tunnel-like member having a substantially large cross-sectional area and having a bottom closure panel overlying the floor panel structure to provide a bottom closure of double thickness, the floor panel structure being united throughout its length to the tunnel-like member; and a bulkhead panel, secured to the outriggers, and also secured to, and thus stabilizing the adjoining mouth of the tunnel-like member.

2. A motor vehicle chassis frame or underbody structure according to claim 1, inwhich the tunnel-like member has a pair of flanged longitudinal side panels which project from its forward end to form cantilever girders, these girders being interconnected by a cross-member and being stabilized transversely by means of oblique struts affording rigid anchorages to the main structure of the chassis frame.

3. A motor vehicle chassis frame according to claim 1, in which additional strength is imparted to the frame by a dash panel assembly comprising a substantially horizontal top transverse panel formed with a downwardly extending central portion which is attached to the top of the tunnel-like member, and a pair of angled buttress panels which are secured respectively to the said downwardly extending central portion, to the top of the tunnel-like member, to the bulkhead panel and to vertical side panels which are secured to the main chassis frame structure.

4. A motor vehicle chassis frame according to claim 1, in which the tunnel-like member extends rearwardly beyond the floor panel structure to support a differential gear assembly.

References Cited by the Examiner
UNITED STATES PATENTS

| | | |
|---|---|---|
| 2,108,191 | 2/1938 | Begg. |
| 2,226,790 | 12/1940 | Valletta. |
| 2,933,341 | 4/1960 | Muller _____ 296—28 |

BENJAMIN HERSH, *Primary Examiner.*

P. GOODMAN, *Examiner.*